UNITED STATES PATENT OFFICE.

JAMES DE SELDING BROWN, OF PHILADELPHIA, PENNSYLVANIA, ASSIGNOR TO HIMSELF AND HENRY AYRES, OF SAME PLACE.

COMPOSITION OF MATTER AS A SUBSTITUTE FOR HARD RUBBER.

SPECIFICATION forming part of Letters Patent No. 499,354, dated June 13, 1893.

Application filed March 3, 1891. Serial No. 383,627. (No specimens.)

*To all whom it may concern:*

Be it known that I, JAMES DE SELDING BROWN, a citizen of the United States, residing in the city and county of Philadelphia, in the State of Pennsylvania, have invented a certain new and useful Composition of Matter as a Substitute for Hard Rubber, of which the following is a specification.

I have discovered that asphalts, such as Neufchâtel and Trinidad, and any other kind of bitumen, as coal-tar, petroleum pitch, &c., by the incorporation of a sufficient quantity of sulphur and subjecting to a prolonged heat at 300° to 400° Fahrenheit in confined molds, in a manner closely analogous to that used in vulcanizing india rubber, and allied gums, attain new and valuable qualities so as to adapt them for various uses, eminently as a substitute for hard rubber, in manufactured articles for use and ornament, as knife handles, pen holders, buttons, combs, door-knobs, &c., and as a tenacious cementing medium for mechanical purposes, as the binding or holding together of emery or other substance for grinding and polishing, and also as an insulating material for electrical use. This is the basis of my invention.

The vulcanized material I make as follows: To seventy-five pounds of refined asphalt, coal tar, petroleum, pitch or other bitumen, at from 250° to 300° Fahrenheit, I add twenty-five pounds of ground or flour sulphur, twenty pounds of peroxide of lead thoroughly incorporated, then cool to 200° Fahrenheit and add three pounds of gum-camphor. This material is then at the consistency of thick paste or dough, and is placed in an air-tight cylinder, with the necessary steam pipe to generate the required heat, and with a hand or man-hole for access to the interior. After the material is placed therein, the cylinder is closed and atmosphere is supplied and maintained with an air-pump at a pressure of one hundred pounds or more to the square inch. This air pressure prevents the volatilizing of the compound at the vulcanizing temperature, at which temperature, 300° to 400° Fahrenheit the compound is held for several hours, after which it is removed from the cylinder and allowed to cool. The compound can also be vulcanized by confining in sealed molds and placing in an oven or kiln, as is usually practiced with rubber. It is important that the composition be as homogeneous in its constituents as possible. This material when removed after being so treated, is unaffected by cold down to 30° below zero, or by heat up to 1,000° above zero, Fahrenheit and is not affected by lubricating oils under 300° Fahrenheit.

For knife handles, pen holders, combs, door-knobs, &c., to the original constituents as described, can be added as much as they will take of silica, carbonate of lime, fluor-spar, hardwood sawdust, ground cork, sulphate of lime, graphite, asbestus or raw-hide, either separately or in combination, and the combination thus made, at a temperature of 270° to 290° Fahrenheit, is placed in suitable molds, previously heated to the same temperature as the material, and is compressed at from one thousand to ten thousand pounds per square inch by hydraulic or other pressure, according to the flexibility or hardness desired, and is then vulcanized by the process as described.

If the material when taken from the vulcanizer is of the desired shape and form, no further manipulation is necessary, other than polishing. If not, it can be worked into the required shape and form by the usual tools and method of working metals.

The other ingredients than bitumen and sulphur are not absolutely essential to success. I can make a very good article by mixing with the bitumen the large proportion of sulphur described without the other materials, and subjecting the bitumen and sulphur to heat and pressure in the manner described.

For a tenacious cementing medium for mechanical purposes, as the binding together of emery for grinding or polishing, to the original constituents as described at about 250° Fahrenheit, can be added and incorporated as much of the emery or other substance as the original constituents will take; the combination thus formed is then molded, compressed and vulcanized as described.

For insulating material for electrical use, I use asbestus, pulverized cork or other insulating substance as much as the original constituents will take; and then mold, compress and vulcanize, as described.

I am aware that it has previously been proposed to manufacture a soft compound for covering electric cables, composed largely of oils with a small proportion, only from twelve to twenty per cent., of bitumen, and to vulcanize that soft compound. Such I do not claim. I attach much importance to the facts that bitumen constitutes a great part of my composition, and that the final result of my treatment is a hard mass suitable for shaft bearings and analogous articles, which will retain its shape under all ordinary conditions; and that it possesses the unusual qualities of being unaffected by lubricating oils and of maintaining its integrity and form up to the temperature of red hot iron,—1,000° Fahrenheit

I claim as my invention—

1. The process of making a composition resembling hard rubber, by heating bitumen under pressure with the specified proportion of sulphur at the temperature described, and thereby converting said bitumen into a tough hard body having the characteristics set forth.

2. The composition resembling hard rubber and consisting of bitumen and sulphur, with fine filling, as lead peroxide for example, and gum camphor incorporated with said bitumen, and toughened and hardened by heat, substantially as described.

In testimony that I claim the invention above set forth I affix my signature in presence of two witnesses.

JAMES DE SELDING BROWN.

Witnesses:
CHARLES R. SEARLE,
M. F. BOYLE.